Feb. 8, 1949.　　　J. G. CAPSTAFF　　　2,461,140
DOUBLE SHUTTER HEAT PROTECTION FOR
MOTION-PICTURE PROJECTORS
Filed Nov. 13, 1947
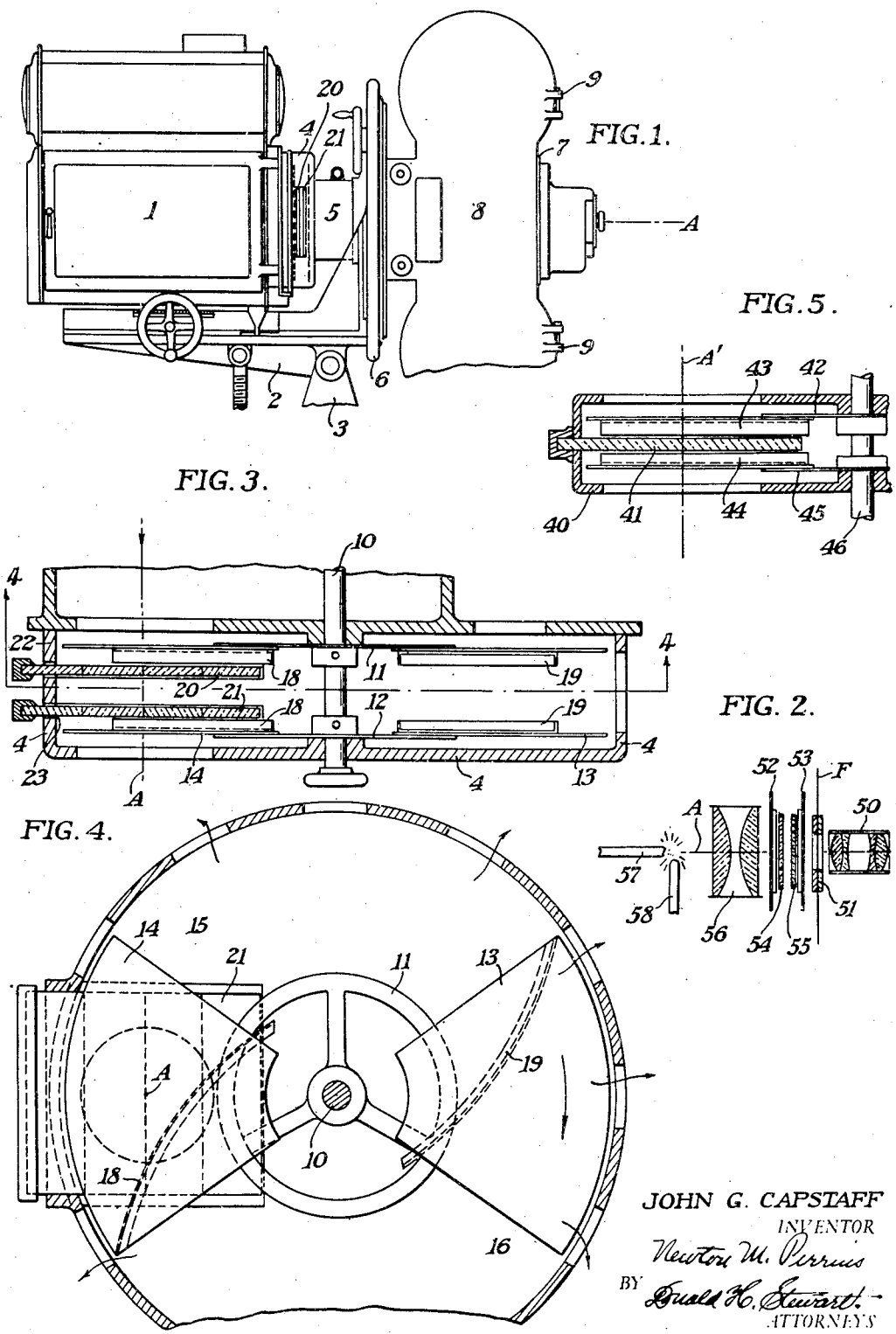
JOHN G. CAPSTAFF
INVENTOR Patented Feb. 8, 1949

2,461,140

UNITED STATES PATENT OFFICE 2,461,140

DOUBLE SHUTTER HEAT PROTECTION FOR MOTION-PICTURE PROJECTORS

John G. Capstaff, Rochester, N. Y., assignor to Eastman Kodak Company, Rochester, N. Y., a corporation of New Jersey Application November 13, 1947, Serial No. 785,688

2 Claims. (Cl. 88—17)

This invention relates to photography and more particularly to heat-protection devices for motion-picture projectors. One object of the invention is to provide a means for using a very high ampere arc light system in a projector without damaging the film from heat. Another object of the invention is to provide a heat-protecting device which can be applied to standard types of motion-picture projectors. A still further object of the invention is to provide a projector with heat screens of heat-resisting and/or heat-absorbing glass which screen is in turn cooled by a special shutter arrangement. Other objects will appear from the following specification, the novel features being particularly pointed out in the claims at the end thereof.

It becomes increasingly desirable in theaters to use more light for projection. When this is done, the increased heat accompanying the light may seriously harm the motion-picture film unless something is done to filter out the excess heat (infrared rays). My invention is particularly directed to a shutter structure for reducing the heat reaching the film.

Coming now to the drawings wherein like reference characters may denote like parts throughout:

Fig. 1 is a side elevation of a typical motion-picture projecting machine to which a safety device, constructed in accordance with and embodying a preferred form of my invention, may be applied;

Fig. 2 is a schematic diagram of the optical system employed in the projector of Fig. 1;

Fig. 3 is an enlarged sectional view taken through the protective shutter casing of the projector of Fig. 1, parts being shown in elevation;

Fig. 4 is a section taken on line 4—4 of Fig. 3; and

Fig. 5 is a fragmentary section through another embodiment of my invention.

My invention broadly consists in utilizing known types of heat-resisting and/or heat-absorbing glass in the light beam of a projector and in providing a double shutter having vanes, or fins, passing close to the glass for sweeping off the hot layer of air adjacent to surfaces of the glass and for exposing the glass to the light beam a minimum amount of time.

A typical projector, to which my double shutter for protecting a heat screen applies, is shown in Fig. 1. This may consist of a lamp house 1 which may be mounted on a suitable table top 2 carried by a support 3. The top 2 may be tilted to properly align the optical axis A. On the front of a lamp house 1 there is a shutter casing 4, a tubular extension of this casing 5 extending forwardly to a wall 6 supporting a casing 7. This casing carries a cover 8 hinged at 9 to the casing so that it may be opened to thread film F through the required path.

My invention may be applied to this or other standard types of projector by mounting the shutter and heat screen arrangement shown in Figs. 3 and 4. The shutter structure is preferably mounted in the shutter protective casing 4.

The shutter casing 4, as shown in the horizontal section in Fig. 3, may include the usual power-driven shutter shaft 10. This shaft may carry two spaced shutter members 11 and 12, each of these shutter members including arcuate blades 13 and 14 having openings or cut-outs 15 and 16 between the shutter blades to permit the passage of light along the optical system axis A. Each of the shutter blades 13 and 14 is provided with fins 18 and 19; these fins being preferably curved, as indicated in the drawings, and facing the opposite shutter member. Thus, the two-part shutter consists of two similar shutter blades with similar fins designed to pass close to the surface of a heat screen which may consist of a heat-resisting glass plate 20 and a heat-absorbing glass plate 21 which may lie across the axis A of the light beam passing to the film F. The glass plates 20 and 21 may be moved into the casing 4 through suitable slots 22 and 23. These plates may be a single pane of glass, but are preferably each formed of strips, or bands, of glass as these withstand heat better than a single pane.

As the shutter shaft 10 is rotated, the rear-shutter member 11 will permit the light to reach the heat screens only intermittently. With the constructions shown in the drawings, the glass will be protected from the direct heat from the arc through 144° of each revolution of the shutter. Thus, the screen will be exposed during 216° of each revolution. During each revolution, the fins 18 and 19 will sweep across the surface of the heat-resisting glass twice to sweep off the layer of hot air adjacent the surface of the glass. If the screen is composed of two glass plates, as indicated in Fig. 3 at 20 and 21, they may be spaced apart—say a distance of a half-inch—so that air may pass between these glass screens.

In the second embodiment of the invention shown in Fig. 5, the protective shutter casing 40 may be provided with a heat screen composed of a single plate of heat-absorbing glass 41 which lies on the axis A' of the optical system. In this case, the shutter 42 is provided with fins 43 similar to and facing fins 44 on the shutter 45. Both these shutters turn together with the power-driven shaft 46. Where a single glass screen 41 is used, the layer of air on both sides of the glass plate is swept from the plate twice at each revolution of the shutter so that the temperature of the heat-absorbing glass may be kept down within reasonable limits.

As indicated in Fig. 2, the optical system may include an arc 57—58, a condenser lens 56, a film gate 51 through which a film F passes, and a projection lens 50, all coaxially arranged on the axis A. The double safety shutter 52—53 may be employed with a heat screen composed of two pieces of safety glass 54 and 55. Fig. 2 is entirely diagrammatic and the spacing of the optical elements forming the system is compressed from the actual spacing.

It will be noticed with both forms of my invention that a safety glass heat screen may be employed in which the screen is submitted to the light beam a minimum amount of time and in which the screen, or screens, lie between a pair of spaced shutter members including fins facing the screen to sweep off the hot air as fast as it forms thereon. The air is continuously circulated through the protective shutter casing 4, as well as being swept off one or more surfaces of the screen. By this arrangement, I have been able to employ exceedingly high-power arc lights with efficient optical systems which, because of their terrific heat, have not been previously used successfully due to damage to the film or damage to the heat-absorbing glass which must be used in order to prevent the film from being damaged. This heat-protective structure is desirable for color film projection, especially where color filters are employed.

Having thus described my invention what I desire to secure by Letters Patent of the United States and what I claim is:

1. A safety device for projectors comprising a source of light, a heat screen in the light beam, a rotary shutter in the light beam, said shutter comprising a pair of spaced shutter members, one on each side of the heat screen, fins carried by the shutter member facing the heat screen and having a path of movement close thereto to sweep off a layer of hot air adjacent the heat screen thereby cooling the heat screen, the fins carried by the shutter members having a length approximately as long as the greatest dimension of the heat screen to sweep the air from the entire faces thereof as said fins pass across the surfaces of the heat screen during rotation of the shutter.

2. A safety device for projectors comprising a source of light, a heat screen in the light beam, a rotary shutter in the light beam, said shutter comprising a pair of spaced shutter members, one on each side of the heat screen, fins carried by the shutter member facing the heat screen and having of movement close thereto to sweep off the layer of hot air adjacent the heat screen thereby cooling the heat screen, the heat screen comprising spaced transparent heat resisting and heat absorbing members of glass, the fins carried by one shutter member sweeping the hot air from one glass member and the fins carried by the other shutter sweeping the hot air from the other glass member.

JOHN G. CAPSTAFF.

REFERENCES CITED

The following references are of record in the file of this patent:

UNITED STATES PATENTS

| Number | Name | Date |
|---|---|---|
| 1,385,162 | Tillyer | July 19, 1921 |
| 1,434,268 | Tillyer | Oct. 31, 1922 |
| 1,750,197 | Schoen | Mar. 11, 1930 |
| 1,884,730 | Kindelmann | Oct. 25, 1932 |
| 1,949,477 | Kindelmann | Mar. 6, 1934 |